United States Patent [19]
Scherbarth et al.

[11] Patent Number: 5,775,454
[45] Date of Patent: Jul. 7, 1998

[54] MOTORCYCLE WITH FRONT FENDER MOUNTING SYSTEM

[75] Inventors: Brian M. Scherbarth, Menomonee Falls; John E. Stelling, Port Washington, both of Wis.

[73] Assignee: Harley-Davidson Motor Company, Milwaukee, Wis.

[21] Appl. No.: 678,507

[22] Filed: Jul. 9, 1996

[51] Int. Cl.⁶ .................................................. B62K 25/08
[52] U.S. Cl. ........................ 180/219; 280/152.1; 280/277; 293/105
[58] Field of Search .................................. 180/219, 227; 280/152.1, 152.2, 152.3, 157, 160.1, 275, 276, 283, 277; 293/102, 105; 301/105.1, 108.1, 108.3, 110.5

[56] References Cited

U.S. PATENT DOCUMENTS

| | | | |
|---|---|---|---|
| 1,408,719 | 3/1922 | Borgo | 280/152.1 |
| 4,775,163 | 10/1988 | McGowan et al. | 280/277 |
| 5,026,083 | 6/1991 | Wendorf | 280/152.1 X |
| 5,165,712 | 11/1992 | Fuller | 280/152.1 X |
| 5,186,274 | 2/1993 | Hegman | 180/227 |

FOREIGN PATENT DOCUMENTS

| | | | |
|---|---|---|---|
| 22695 | 10/1911 | United Kingdom | 280/152.1 |

OTHER PUBLICATIONS

Tony Middlehurst, Harley-Davidson, 1990, pp. 41,43.

*Primary Examiner*—Kevin Hurley
*Attorney, Agent, or Firm*—Michael, Best & Friedrich LLP

[57] ABSTRACT

A motorcycle including a frame, a front fork assembly connected to the frame, a front wheel including a front axle secured to the front fork assembly, and a fender assembly. The fender assembly includes a fender positioned over the front wheel, and a fender strap interconnecting the fender with the front axle such that vertical movement of the front axle results in substantially the same vertical movement of the fender. A brake caliper is connected to the front axle, and a fender bracket interconnects the fender with the brake caliper. A fender bushing is rotatably mounted on the front axle, and the fender strap is connected to the fender bushing. The bushing includes a threaded portion that extends through an opening in the fender strap. The bushing also includes a threaded collar threaded onto the threaded portion to secure the fender strap to the fender bushing. A threaded end cap is threaded onto the threaded portion to cover the front axle, and a resilient gasket is positioned between the end cap and the collar to provide a seal and prevent loosening of the end cap.

20 Claims, 3 Drawing Sheets

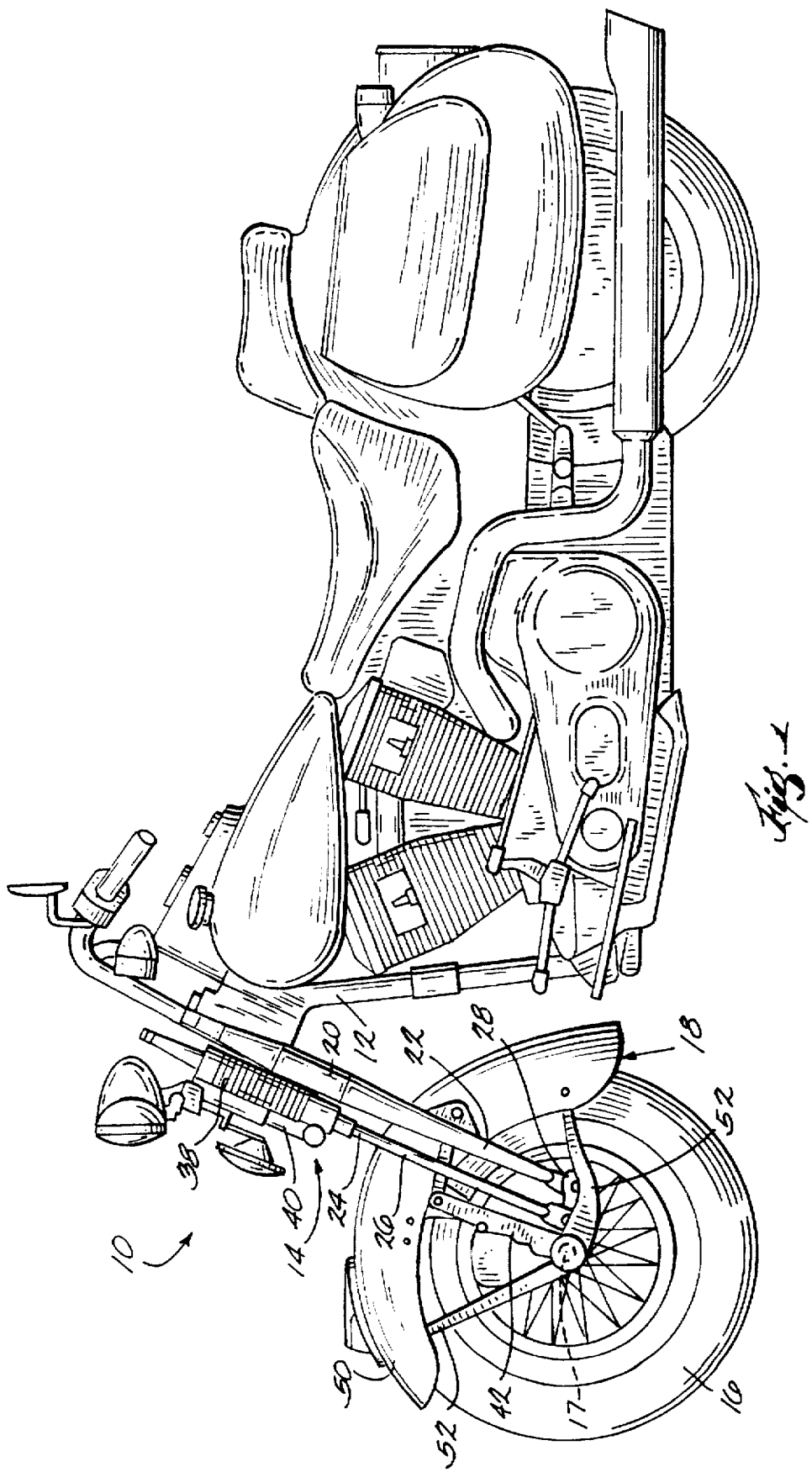

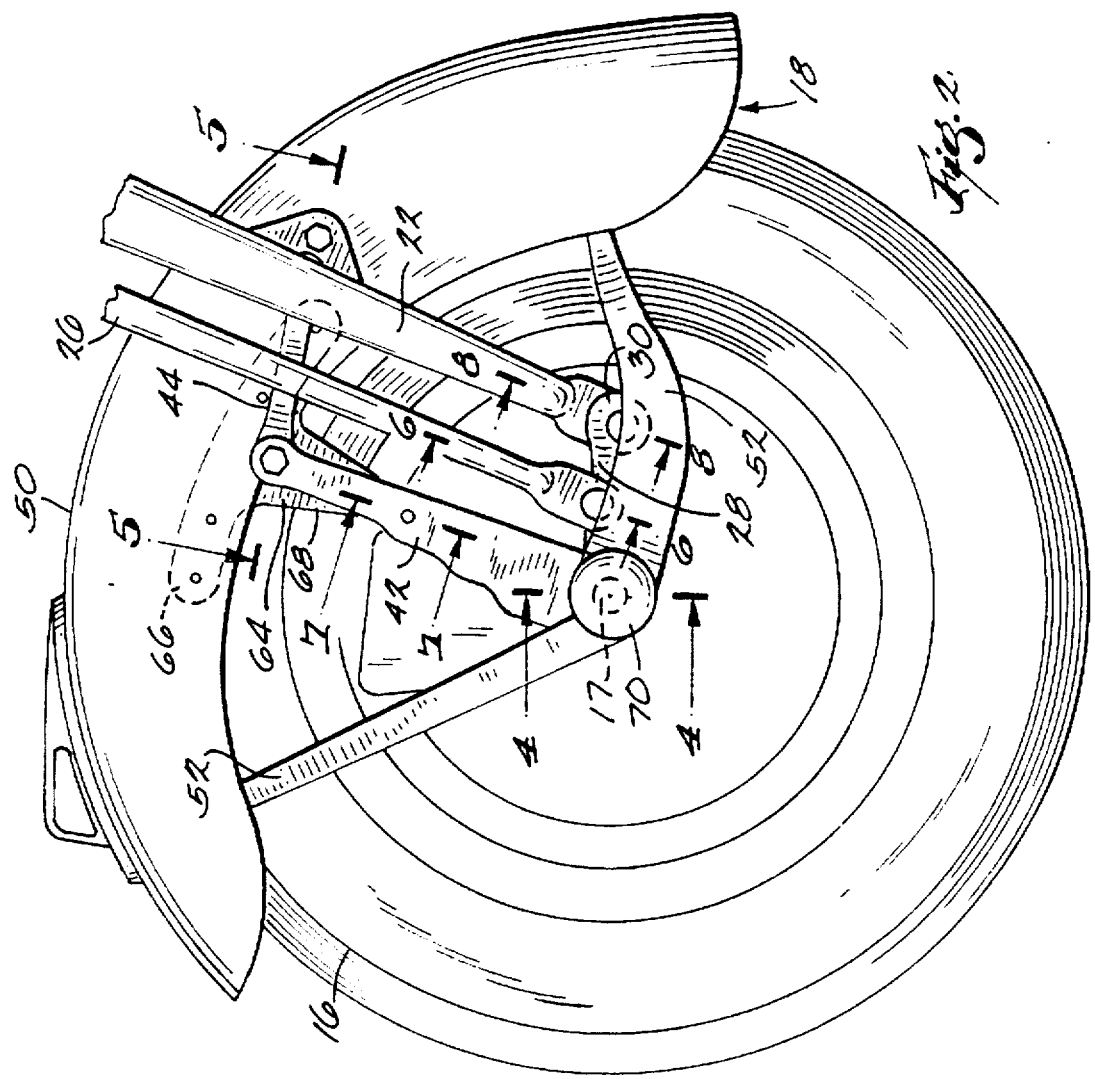
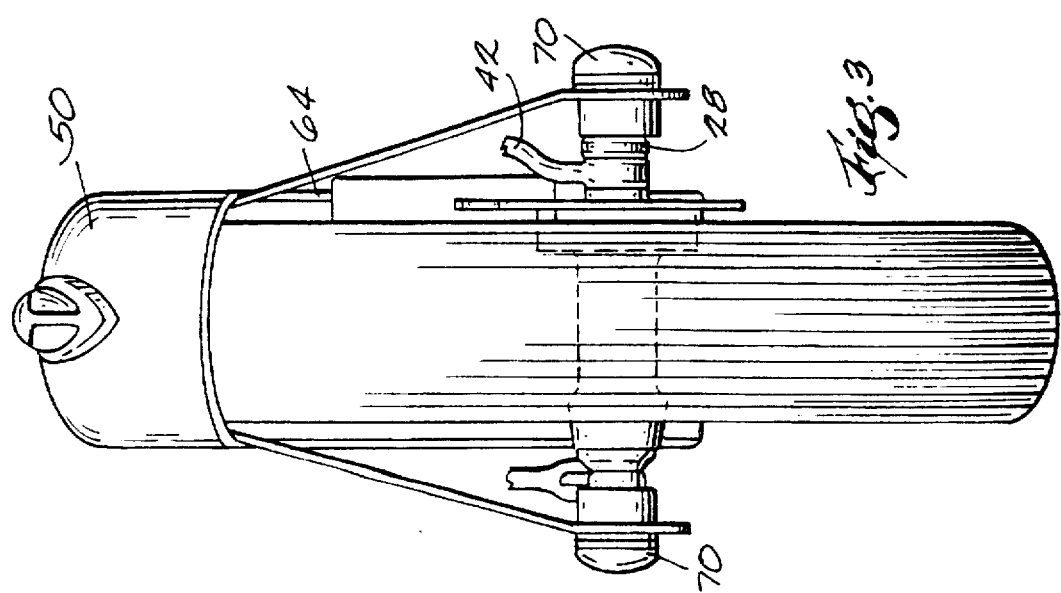

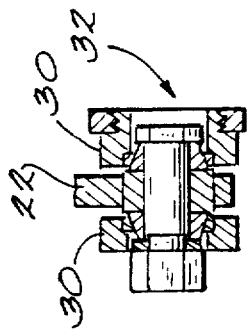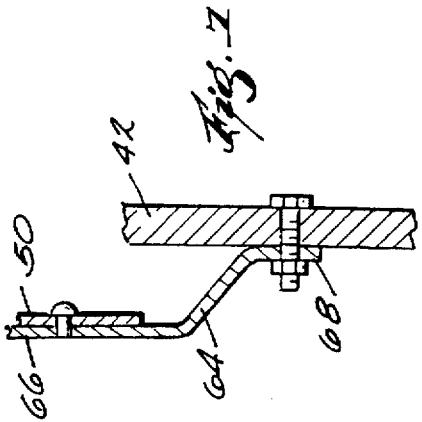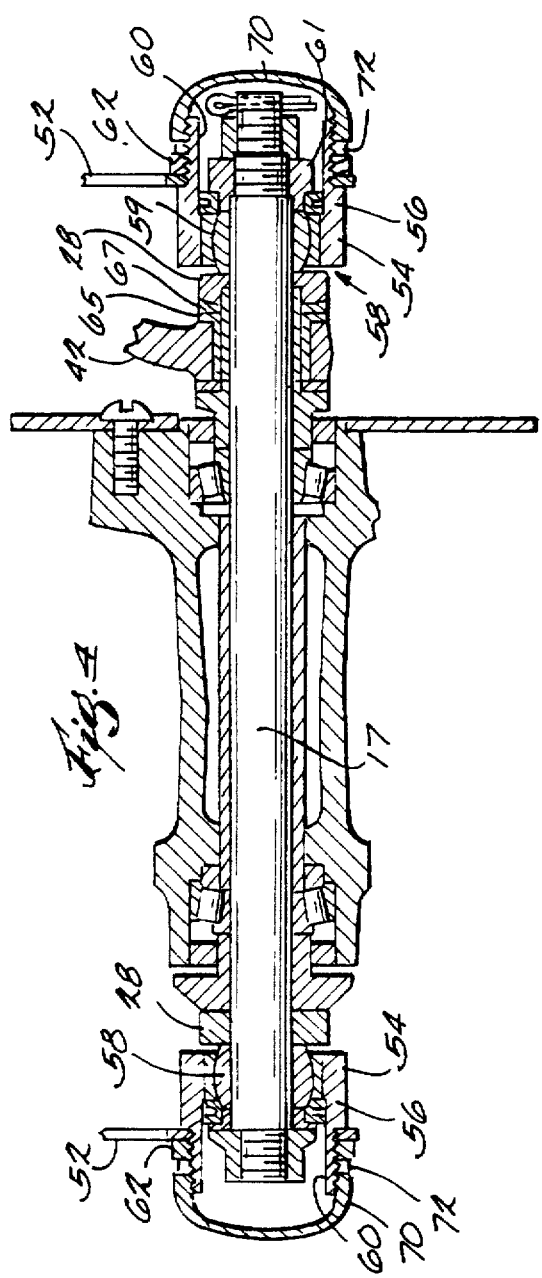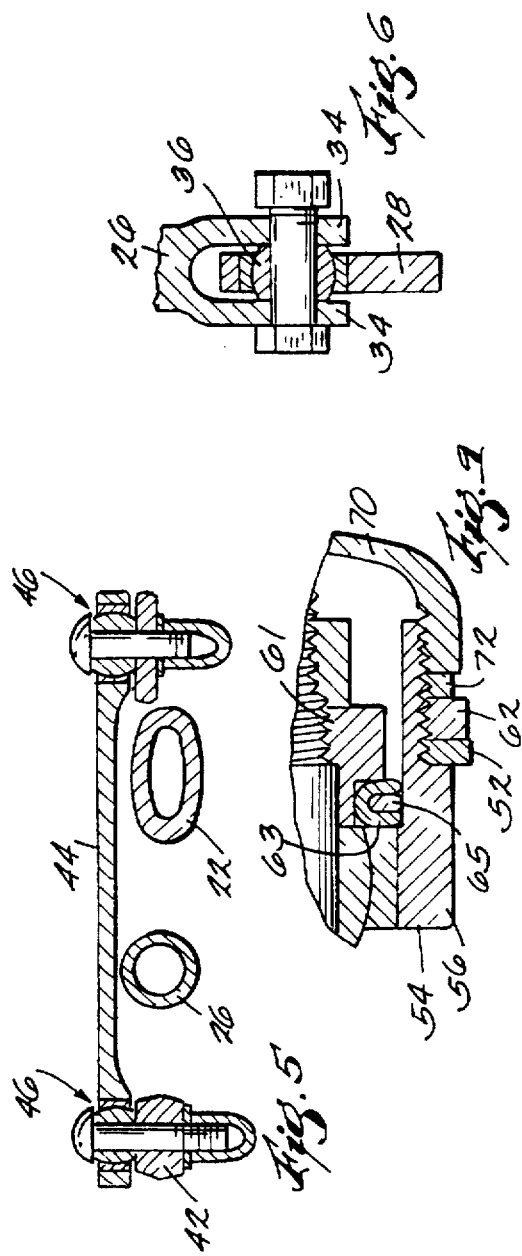

MOTORCYCLE WITH FRONT FENDER MOUNTING SYSTEM

FIELD OF THE INVENTION

The present invention generally relates to the field motorcycles, and more specifically to the field of front fender mounting systems for motorcycles.

BACKGROUND OF THE INVENTION

Motorcycles designed for road use typically include front and rear fenders over the front and rear wheels, respectively. The rear fender is usually rigidly mounted so that it does not move with respect to the motorcycle frame. The front fender, on the other hand, can be rigidly mounted relative to the frame or mounted to "float" with the front wheel.

Some motorcycles include a telescoping fork front suspension. This type of suspension is characterized by upper and lower fork tubes that telescope with each other. The upper fork tube is connected to the frame, and the lower fork tube is rotatably connected to the front wheel. A spring and damper mechanism is positioned within the fork tubes to provide shock absorption and suspension to the front wheel. In this arrangement, floating front fenders can be secured directly to the lower fork tube so that as the wheel and lower fork tube move up to absorb an uneven terrain the front fender will also move up the same amount.

Another type of motorcycle front suspension is called a rocker suspension, as generally illustrated in U.S. Pat. No. 4,775,163. A rocker suspension is characterized by a rigid fork connected to the motorcycle frame, a pair of struts movably connected to the rigid fork, and a pair of rockers connecting a lower end of the rigid fork to the lower end of the struts. The struts are biased downwardly by a spring and damper mechanism, and the rockers are secured to the front wheel axle. The rocker suspension absorbs shocks by allowing the front wheel to move upwardly against the biasing force of the struts. The rigid fork does not move upwardly relative to the frame.

Historically, motorcycles with rocker suspensions had front fenders that were rigidly mounted to the rigid fork. In this regard, the front fenders did not move relative to the frame when the front wheel was absorbing a shock. In order to allow adequate clearance between the wheel and the front fender when the wheel was absorbing a shock, the front fender had to be mounted well above the front wheel. This large clearance used up valuable space and was considered by some to be cosmetically undesirable.

U.S. Pat. No. 5,186,274 illustrates a motorcycle having rocker suspension and a front fender mounted such that it moves with the front wheel when the front wheel is absorbing a shock. The front fender includes a fender bracket that is mounted to the upper end of a brake caliper on one side of the wheel only. Two pivoting links, positioned on either side of the front fender, pivotally connect the front fender with the struts. With this design, the front fender will move with the front wheel.

SUMMARY OF THE INVENTION

The above-described front fender mounting system can suffer from some problems. For example, the mounting system requires a plurality of pivoting links and associated bearings. This can be expensive and time-consuming to manufacture, can add to the overall weight of the motorcycle, and can add to the maintenance of the motorcycle. Another problem is that the struts must be provided with an attaching boss to accommodate the pivoting links. This can add to the manufacturing process (e.g., welding or brazing) and can add to the cost and weight of the motorcycle.

The present invention alleviates the need for a plurality of pivoting links, the associated bearings, and the attaching boss on the struts. In one aspect, the present invention provides a motorcycle including a frame, a front fork assembly (e.g., a rocker suspension) connected to the frame, a front wheel including a front axle secured to the front fork assembly, and a fender assembly. The fender assembly includes a fender positioned over the front wheel, and a fender strap interconnecting the fender with the front axle such that vertical movement of the front axle results in substantially the same vertical movement of the fender. The motorcycle can also include a brake caliper connected to the front axle, and the fender assembly can also include a fender bracket interconnecting the fender with the brake caliper.

The fender assembly preferably includes a fender bushing rotatably mounted (e.g., using a spherical bearing) on the front axle, wherein the fender strap is connected to the fender bushing. The bushing can include a threaded portion, wherein the fender straps include an opening through which the threaded portion extends. The bushing can also include a threaded collar threaded onto the threaded portion to secure the fender strap to the fender bushing.

In another aspect, the present invention provides a motorcycle including a frame, a front fork assembly connected to the frame, a front wheel including a front axle secured to the front fork assembly, and an end cap covering an end of the front axle. Preferably, the end cap is connected to a bushing mounted on the front axle. The bushing can include a threaded portion, and the end cap can be threaded onto the threaded portion. A resilient gasket is preferably positioned between the end cap and the bushing to provide a seal and prevent loosening of the end cap.

BRIEF DESCRIPTION OF THE DRAWINGS

FIG. 1 illustrates a motorcycle embodying the present invention.

FIG. 2 is an enlarged partial side view of the front fender mounting system illustrated in FIG. 1.

FIG. 3 is a front view of the front fender mounting system of FIG. 2.

FIG. 4 is a section view taken along line 4—4 in FIG. 2.

FIG. 5 is a section view taken along line 5—5 in FIG. 2.

FIG. 6 is a section view taken along line 6—6 in FIG. 2.

FIG. 7 is a section view taken along line 7—7 in FIG. 2.

FIG. 8 is a section view taken along line 8—8 in FIG. 2.

FIG. 9 is an enlarged section view of part of FIG. 4.

DETAILED DESCRIPTION

FIG. 1 illustrates a motorcycle 10 having a front fender mounting system embodying the present invention. Briefly, the motorcycle 10 includes a frame 12, a front fork assembly 14 pivotally connected to the frame 12, a front wheel 16 having a front axle 17 connected to the front fork assembly 14, and a fender assembly 18 interconnected with the front wheel 16.

Referring to FIG. 2, the illustrated front fork assembly 14 is a rocker suspension including a rigid fork 20 having left and right fork legs 22, a sprung fork 24 having left and right struts 26, and left and right rockers 28 connecting the lower end of the fork legs 22 to the lower end of the struts 26. The drawings only illustrate the left side of the motorcycle 10, and the right side is substantially the same with respect to the rigid fork 20, sprung fork 24 and rockers 28. In this regard, only the left side of the motorcycle 10 will be describe herein, it being understood that the right side is substantially the same, unless otherwise noted.

A rear portion of the rocker 28 includes rocker prongs 30 (FIG. 8) that are spaced apart for accommodating the lower end of the fork leg 22. The rocker prongs 30 are connected to the fork leg 22 by a spherical bearing 32 (FIG. 8) so that relative pivotal motion is accommodated. The lower end of the strut 26 includes two strut prongs 34 that straddle the middle portion of the rocker 28 (FIG. 6). The strut prongs 34 are interconnected with the rocker 28 by a spherical bearing 36 to accommodate relative pivotal motion. A front portion of the rocker 28 is secured to the front axle 17 (FIG. 4). The struts 26 are biased downwardly by compression springs 38 and motion of the struts 26 is absorbed by the springs 38 and damped by a shock absorber 40 positioned between the springs 38 (FIG. 1). A brake caliper 42 is rotatably mounted on the front axle 17 and is pivotally interconnected with the fork leg 22 by a pivoting link 44 and corresponding spherical bearings 46. Only the left side of the motorcycle 10 includes a brake caliper 42. More specific details regarding the rocker suspension can be found in U.S. Pat. No. 4,775,163, which is incorporated herein by reference in its entirety.

The fender assembly 18 includes a fender 50 and two fender straps 52 secured to and extending radially inwardly from each side of the fender 50. The fender straps 52 are secured to the fender by rivets. In the illustrated embodiment, the fender straps 52 on one side of the fender 50 are made from a single piece of sheet metal.

The fender assembly 18 further includes fender bushings 54 rotatably mounted near the ends of the front axle 17 (FIG. 4). Each of the illustrated bushings 54 includes a cylindrical base portion 56 that is rotatably mounted on the front axle 17 by a spherical bearing 58. Each spherical bearing 58 includes an inner ball 59 that is in hard stack compression between the rocker 28 and a spacer 61. A nylon insert 63 and corresponding resilient, rubber oval ring 65 (FIG. 9) bias the bushing 54 square with the axle 17 while providing a low friction interface. A threaded portion 60 of the bushing 54 is cantilevered off of the base portion 56. The threaded portion 60 extends through a hole in the fender straps 52. A threaded collar 62 is threaded onto the threaded portion 60 and locked in place using an adhesive locking compound (not shown) to secure the fender straps 52 to the fender bushing 54. In this manner, movement of the front axle 17 will result in movement of the fender straps 52 and associated fender 50. A thrust bushing 65 and rubber spacer in the form of a quad ring 67 are positioned between the rocker 28 and the brake caliper 42.

The fender assembly 18 further includes a fender bracket 64 extending radially inwardly from the fender 50 on one side of the fender 50 only (i.e., the left side in the illustrated embodiment). The fender bracket 64 includes a wide base portion 66 (FIG. 2) that is riveted to the fender 50, and a narrower bracket portion 68 that is secured to the brake caliper 42.

In operation, the illustrated fender assembly 18 will follow the motion of the brake caliper 42 when the front wheel 16 is absorbing a shock. More specifically, when the front wheel 16 is forced upward relative to the frame 12, the front axle 17 will move upward the same amount. Upward movement is transferred from the front axle 17 to the fender straps 52 and to the brake caliper 42 due to the direct connection therebetween. The fender 50 follows the motion of the fender straps 52 and the brake caliper 42 due to the connection therebetween.

An end cap 70 covers each end of the front axle 17. The end caps protect the front axle 17 and associated bearings from damage that can be caused by contamination by water or dirt. Each end cap is threaded onto the threaded portion of the corresponding bushing 54. A resilient gasket 72 is positioned between the end cap 70 and the threaded collar 62 to provide a sealed barrier and to inhibit undesired loosening of the end cap due to vibration. Because of its large size, the end cap can be tightened and loosened by hand.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A motorcycle comprising:
   a frame;
   a front fork assembly connected to said frame;
   a front wheel including a front axle secured to said front fork assembly; and
   a fender assembly including:
     a fender positioned over said front wheel; and
     a fender strap interconnecting said fender with said front axle such that vertical movement of said front axle results in substantially the same vertical movement of said fender; and
     a bearing interconnecting said front axle with said fender strap such that said fender assembly is rotatably mounted to said front axle.

2. A motorcycle as claimed in claim 1, wherein said front fork assembly comprises a rocker suspension.

3. A motorcycle as claimed in claim 1, wherein said bearing comprises a fender bushing, said fender strap being connected to said fender bushing.

4. A motorcycle as claimed in claim 1, wherein said bearing further comprises a spherical bearing.

5. A motorcycle as claimed in claim 4, further comprising a resilient insert positioned adjacent to said spherical bearing to bias said fender bushing square with said front axle.

6. A motorcycle as claimed in claim 5, wherein said resilient insert comprises a nylon insert and a resilient ring.

7. A motorcycle as claimed in claim 3, wherein said fender bushing includes a threaded portion, wherein said fender strap includes an opening through which said threaded portion extends.

8. A motorcycle as claimed in claim 7, wherein said bushing further includes a threaded collar threaded onto said threaded portion to secure said fender strap to said fender bushing.

9. A motorcycle as claimed in claim 7, further comprising a threaded end cap threaded onto said threaded portion to cover said front axle.

10. A motorcycle as claimed in claim 9, further comprising a resilient gasket positioned between said end cap and said collar.

11. A motorcycle as claimed in claim 1, wherein said fender assembly includes two pairs of said fender straps, each pair interconnecting said fender with an end of said front axle.

12. A motorcycle comprising:

a frame;

a front fork assembly connected to said frame;

a front wheel including a front axle secured to said front fork assembly; and a fender assembly including:

a fender positioned over said front wheel;

a fender strap interconnecting said fender with said front axle such that vertical movement of said front axle results in substantially the same vertical movement of said fender; and a brake caliper connected to said front axle, wherein said fender assembly further includes a fender bracket interconnecting said fender with said brake caliper.

13. A motorcycle comprising:

a frame;

a front fork assembly connected to said frame;

a front wheel including a front axle secured to said front fork assembly, said front axle including two ends; and an end cap covering an end of said front axle and rotatable mounted to said front axle.

14. A motorcycle as claimed in claim 13, further comprising a bushing mounted on said front axle, wherein said end cap is connected to said bushing.

15. A motorcycle as claimed in claim 14, wherein said bushing includes a threaded portion, and wherein said end cap is threaded onto said threaded portion.

16. A motorcycle as claimed in claim 14, wherein said bushing is rotatably mounted on said front axle.

17. A motorcycle as claimed in claim 16, wherein said bushing is mounted on said front axle by a spherical bearing.

18. A motorcycle as claimed in claim 17, further comprising a resilient insert positioned adjacent to said spherical bearing to bias said fender bushing square with said front axle.

19. A motorcycle as claimed in claim 18, wherein said resilient insert comprises a nylon insert and a resilient ring.

20. A motorcycle as claimed in claim 14, further comprising a resilient gasket positioned between said end cap and said bushing.

* * * * *